United States Patent
Nakanishi

[19]

[11] Patent Number: 6,045,274
[45] Date of Patent: *Apr. 4, 2000

[54] POWER SUPPLY APPARATUS

[75] Inventor: Hideki Nakanishi, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/597,698

[22] Filed: Feb. 6, 1996

[30] Foreign Application Priority Data

Feb. 6, 1995 [JP] Japan .................................. 7-017950
Jan. 24, 1996 [JP] Japan .................................. 8-010165

[51] Int. Cl.$^7$ .................................................. B41J 29/38
[52] U.S. Cl. .............................................. 400/54; 400/74
[58] Field of Search ........................... 400/54, 74; 347/23

[56] References Cited

U.S. PATENT DOCUMENTS

| | | | |
|---|---|---|---|
| 4,540,997 | 9/1985 | Biggs et al. ................................ | 347/23 |
| 4,967,204 | 10/1990 | Terasawa et al. .......................... | 347/23 |
| 5,341,163 | 8/1994 | Hanabusa .................................. | 347/23 |

FOREIGN PATENT DOCUMENTS 0 449 154 A2  10/1991  European Pat. Off. .

OTHER PUBLICATIONS

Patent Abstracts of Japan, vol. 012, No. 443 (P–790), Nov. 22, 1998 & JP 63 172317 A (Fujitsu LTD), Jul. 16, 1998.
Patent Abstracts of Japan, vol. 015, No. 279 (M–1136), Jul. 16, 1991 & JP 03 097580 A (Fujitsu LTD), Apr. 23, 1991.
Patent Abstracts of Japan, vol. 006, No. 229 (P–155), Nov. 16, 1982 & JP 57 130130 A (Nissan Jidosha KK), Aug. 12, 1982.
Patent Abstracts of Japan, vol. 010, No. 068 (P–437), Mar. 18, 1986 & JP 60 207920 A (Cannon KK), Oct. 19, 1985.
Patent Abstracts of Japan, vol. 013, No. 064 (P–827), Feb. 14, 1989 & JP 63 250754 A (Fuji Electric Co LTD), Oct. 18, 1988.
Patent Abstracts of Japan, vol. 018, No. 405 (P–1778), Jul. 28, 1994 & JP 06 119087 A (NEC Corp), Apr. 28, 1994.

*Primary Examiner*—Edgar Burr
*Assistant Examiner*—Minh Chau
*Attorney, Agent, or Firm*—Fitzpatrick, Cella, Harper & Scinto

[57] ABSTRACT

The present invention relates to a power supply apparatus and provides a power supply apparatus capable of properly performing the protective operation at the completion of use of the instrument connected through the power supply line, when and after suspension of supplement from the side of the power supply apparatus. In response to the on/off operation of a switch 106 which is responsive to the closing/opening movement of the top cover member of the instrument for which the electric power is supplied, a MPU 110 generates an instruction for the instrument to move a state in which the instrument has turned to no-use condition and to be suspended to receive the power supply, and, based on the instruction, by means of a timer 107, after a predetermined period of time is measured, the supplement of the power supply is suspended.

16 Claims, 9 Drawing Sheets

POWER SUPPLY APPARATUS

BACKGROUND OF THE INVENTION

1. Field of the Invention

The present invention relates to a power supply apparatus including a power source and for supplying an electric power for the instrument connected to the power supply apparatus.

2. Description of the Related Art

The recording apparatus which records according to the image information the images including letters and symbols in the recorded material (viz. recording medium) of paper or plastic thin sheet is widely commercialized as the output apparatus of computer and word processor.

Such recording apparatus if used in such office automation apparatus as copier and facsimile adding a means of communication and a means to read image. The combined apparatus which combines the functions of copier, printer and facsimile has been recently commercialized.

Such apparatus uses usually the power source to drive and control. In addition to the recording apparatus, the communication apparatus and the personal information terminal are connected to the power apparatus whereby enable to supply the power source and to control each.

Recently the computing apparatus to control the apparatus, the circuit and the driving apparatus are of increased integration and downsizing to expedite further more downsizing and multifunctioning the apparatus. The apparatus downsizing brings the portability for a person to enable carrying. The apparatus with cordless can, if necessary, be freely used without connecting to the home power source. The portable use without connecting to the home power source is usually structured to store inside such the power supply apparatus as a battery pack or to easily connect to such a small and light carryable battery pack.

Now that the communication and the office automation apparatus are widely made portable and cordless, a variety of items are required for the specification of the battery pack of the power supply for the apparatus.

Figures 1A, 1A:
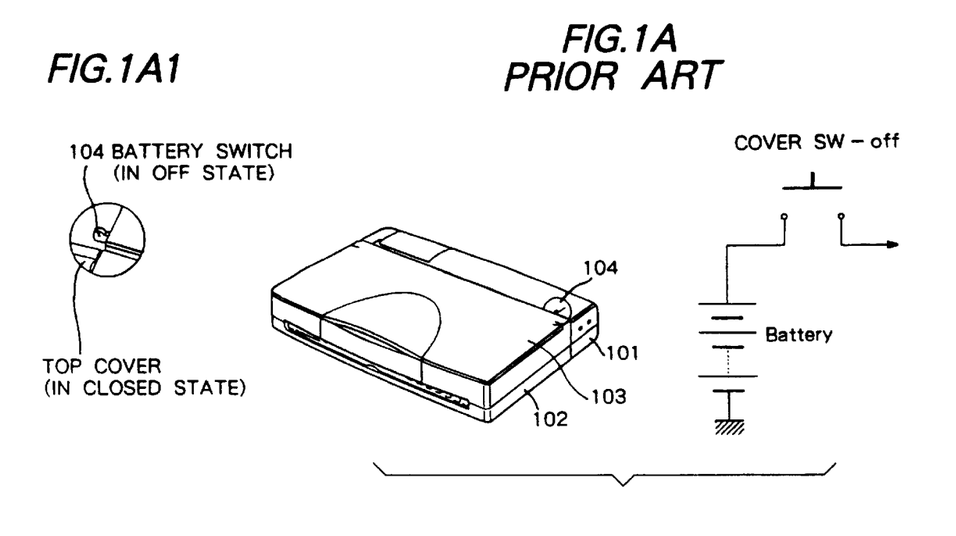
Figure 1B:
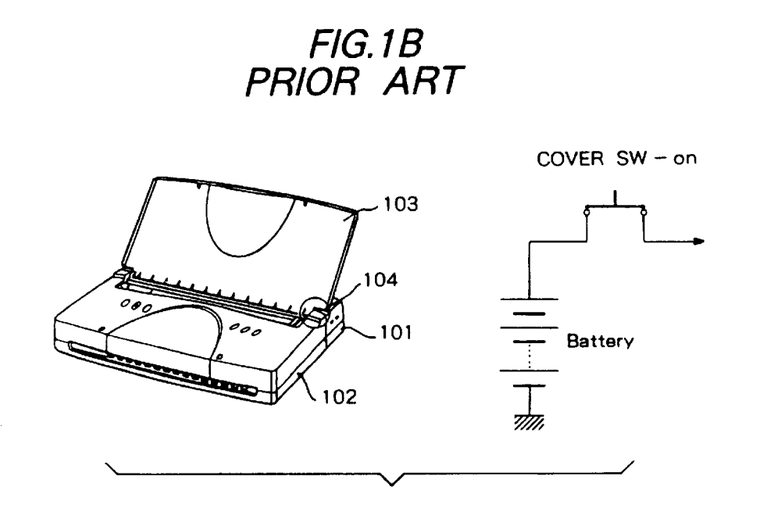
Figure 2A:
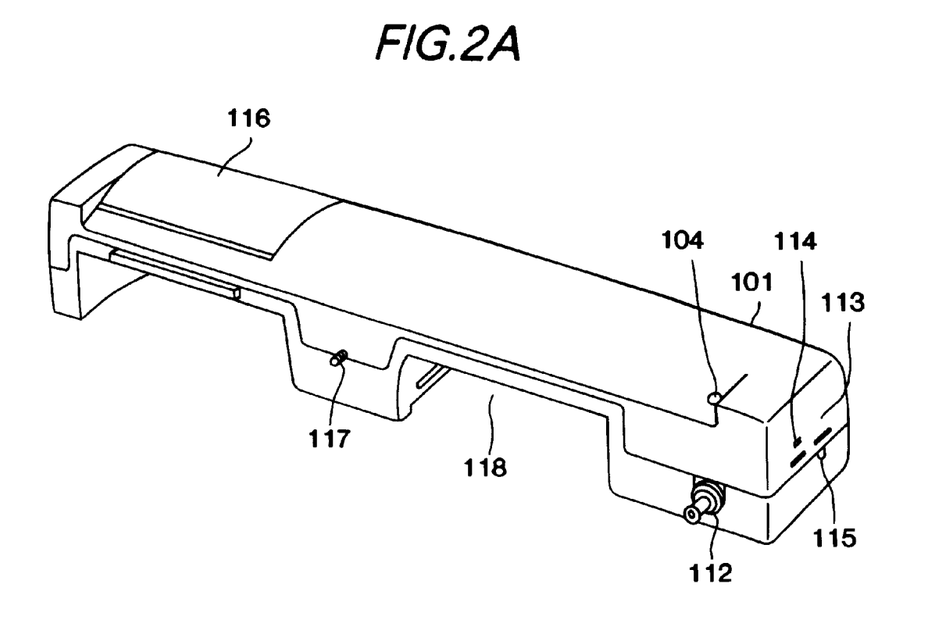
FIG. 2A and 2B each is an external perspective view of a battery pack apparatus according to the present invention.
Figure 2B:
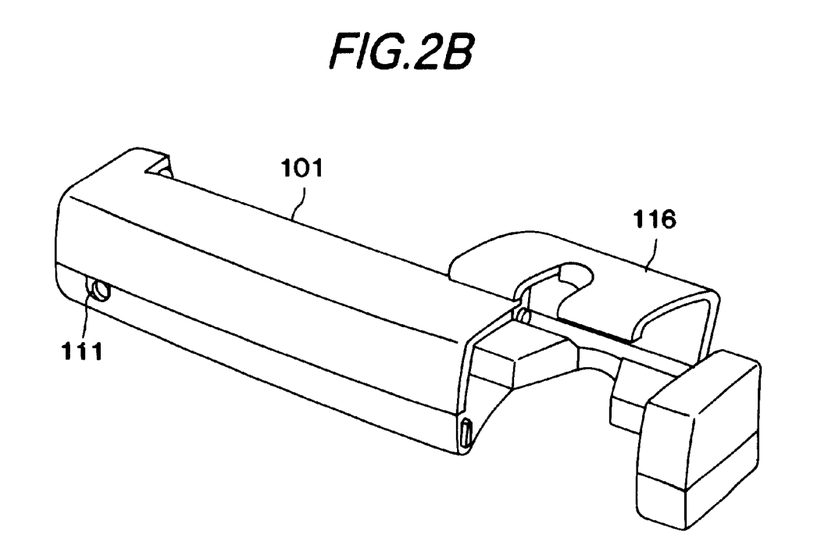

In the battery pack used in the printer as the above-mentioned recording apparatus, there is the following embodiment which is required to satisfy the following specification described hereunder with reference to FIGS. 1 and 2.

FIG. 1 shows the apparatus which includes the battery pack as the power supply source to the printer connecting to the power supply source.

A reference numeral 101 is the battery case as the power supply means provided for the printer 102 and to supply the power source to the printer 102, and internally includes the battery pack as the power source.

Battery case 101 has the structure to easily be fixed to the exterior of the printer 102. The battery case 101 has the power source switch 104 responsive to the movement of the upper cover 103 on the printer 102.

The function of the power source switch 104 is described hereunder. As shown in FIG. 1A, non-use of the printer 102 closes the upper cover 103 and opens the power source switch 104. Then, the power source switch 104 is turned off and the power output of the battery case 101 is not supplied the power source to the printer 102.

In use of the printer 102, as shown in FIG. 1B, the upper cover 103 is opened and the power source switch 104 is pushed downward by the upper cover 103. The power source switch 104 turns on the power source output of the battery case 101 to supply the power source to the printer 102.

FIG. 2 is the external perspective view of in detail the battery case 101. FIG. 2A is a view from the side connected to the printer 102 and FIG. 2B shows a drawing seen from the rear of the apparatus.

In FIG. 2A, a numeral 104 is the battery switch as mentioned above. In use of the printer, the upper cover 103 in the printer 102 is opened and the battery switch 104 is pushed downward to be turned on. And the power source of the battery case 101 supplies the power source to the printer 102. The battery mounting portion 118 is to fix the battery as the power source and functions to make the battery pack (not shown) removable. The power source of the battery pack fixed to the battery case 101 uses the power source with a charge system whereby the source can be repeatedly used by charging it. Numeral 112 is the power source plug to supply the power source by connecting at the time fixed to the printer 102 to the unshown connecting portion fixed to the printer 102. The battery case 101 is formed to be fixed to the printer 102 by the retainer screw 117. #

The battery case 101 is provided with the manifest portions 113 and 114 to show the present status. Numeral 114 is the charging lamp and is the LED flashing at the time the battery pack is charging. Numeral 113 is the discharging lamp and flashes at the time the user instructs to discharge by the discharging switch 115 so that the user may recognize the discharging status. Numeral 116 is the interface cover and functions by opening the interface cover 116 to easily remove the interface cable which connects to the printer 102 and transfers the printing data.

FIG. 2B is the external perspective view of the battery case 101 seen from the different direction and shows the interface cover 116 under open status. Numeral 111 is the adaptor connection portion that connects the plug from the unshown AC adaptor in order to supply the power source from the home power source to the printer 102.

The battery pack 101 is formed to enable the charge of the battery pack by the power source from an AC adaptor connected to the adaptor connection portion. It may be that at the time the AC adaptor is connected, the battery pack does not supply the power source to the printer 102 but the AC adaptor supply is preferably the power source.

The recording system for the printer 102 includes an jet recording system to form the image on the recorded material by injecting the ink and the thermal system to form the image by transferring the ink of the ink sheet on the recorded material with the thermal control in accordance with the recording signal.

The printer 102 has, when adopting the ink jet recording system, such special functions, which cannot be found in other recording systems, as the function to clean the face of the ink injected, the function to restore the injected status by discharging the ink unusable with the ink clogged in the jet face and the raised viscosity, and the function to perform the cap action for preventing vaporation of the ink by covering the face the ink injected and fixing the cap member to the ink jet face.

Further, the printer is usually provided with a micro-processing unit (hereinafter is called as MPU) to control the inside of the printer.

As mentioned above, the battery pack 101 has the function to automatically change "on" and/or "off" of the power source switch 104 responsive to opening and closing status of the upper cover 103 of the printer 102. The aim of the above function is to prevent unnecessary consumption of battery power at the time the printer is not in use.

The features of the above function lies in the very simple structure, viz. the judgment whether in use or non-use of the printer 102 is made by a mechanical structure without any control signal line to control the supply of power source between the printer 102 and the battery pack 101.

Almost all of the electric and the electronic apparatus performing with the power source do not stop immediately after the power source is turned off. Prior to being turned off the action to protect the apparatus is usually performed in either way.

For example, the printer stated in the above prior art performs the protection action to maintain the printing grade at the time the power source is turned off. An example of the above protection action is the action to revolve the home position for returning to the standard position.

Further, the printer adopting the ink jet recording system includes the cleaning action to clean the face of the printing head, the restoring action to restore injected status of the printing head and to maintain the injected status stable, and the capping action to prevent the ink from vaporizing and the ink neighbouring the jet from exiting by adhesion.

It is preferable after performing the above actions to actually stop the supply of the power source to the apparatus despite the micro-processing unit, the controlling means inside the printer, detecting the instruction to turn off the power source. It is preferable after some ten seconds or some minutes from the time instructing the power source off to actually stop the supply of the power source.

The prior art described with reference to the FIG. 1 has the following problems.

The structure provided with the battery pack in the prior art performs the simple mechanical operation responsive to opening and closing of the upper cover for changing on and/or off of the power source switch 104.

Thus, the waiting time necessary for transferring from the power source on to off scarcely exists.

Namely, immediately after the close of the upper cover 103 in the printer 102, the supply of the power source stops and thus there exists no time for the protection action.

It is assumed that the printer 102 remains inoperable without receiving any protective action which results in the bad effect for the printing head function and in the deterioration for the printing quality.

The ink jet printer using especially the printing head in the ink jet recording system requires the protection action to maintain good printing grade and prefers to perform the action without stopping the supply of the power source under no protection action or without stopping the supply of the power source during the protective action.

To prevent the malfunctions, such a method as MPU inside the printer 102 controlling the status of the power source switch 104 provided with the battery case 101 has been considered.

However, this method has the defect to complicating the structures of the battery pack and battery case 101, viz. it requires a controlling signal line for controlling the power source switch 104 between the battery case 101 and the printer 102, in addition to the power source supply line.

SUMMARY OF THE INVENTION

The present invention has been made in order to overcame the aforementioned disadvantages. Accordingly, an object of the invention is to provide a power supply apparatus capable of properly performing the operation which is to be performed by the instrument connected to the power supply prior to disconnection of the same power supply with maintaining a simplified construction between the power supply device and the instrument which is supplied with the power to operate.

Accordingly, the power supply apparatus according to the invention includes a power supply device and supplies an electric power for an instrument connected thereto, and the aforementioned object is achieved by the construction of including switch means for selecting on/off instructions for supplying the electric power to the instrument; and control means for measuring the time duration after the switch means is converted to a state for instructing suspension of supplement of the electric power for the instrument, at the time when the switch means is converted to the state; and for suspending the supplement of the electric power for the instrument after a predetermined period of time.

The aforementioned object can be also accomplished by each of the following featured constructions, in that (1) the power supply apparatus is equipped outside the instrument; (2) the control means includes a timer for measuring the period of time necessary to be continued for a predetermined period, after the power supplement has been suspended; and, (3) more specifically, it is featured in that the predetermined period of time, necessary to be continued to supply the power even at the time when converted to the power suspension mode, is to be longer than the period during which the instrument should perform an operation which is necessary to move from the state of being supplied with the power to the other state of being prevented from the power supply.

Also, the present invention is featured to provide an image forming system comprising a recording device having a recording head for creating an image on a recording medium in response to entry of an instruction, and a power supply device equipped outside the recording device and having a power source for supplying an electric power to the recording device; wherein the recording device includes: protective operation means for performing a protective operation for protecting the recording head, when the instruction has not been entered in a first predetermined period of time; and wherein the power supply device includes: switch means for changing-over the indication for the supplement of the electric power for the recording device, in conjunction with a mechanical movement of a particular part of the recording device; and control means for measuring the time duration after the switch means is converted to a state for instructing suspension of supplement of the electric power for the image forming system, at the time when the switch means is converted to the state; and for suspending the supplement of the electric power for the image forming system, after a second predetermined period of time longer than the first predetermined period of time.

Further, by including a selection switch for deciding on/off operation from the power apparatus to the instrument, in the course of being converted from on state to off state in conjunction with the mechanical movement, by suspending the supplement of electric power for a predetermined period of time, the connected instrument is allowed to be protected as required at the time of being powered off.

Particularly for the ink jet printer, the protective operation is properly performed to allow maintenance of excellent printing quality.

BRIEF DESCRIPTION OF THE DRAWINGS

FIG. 1A, 1A1 and 1B each is a perspective view of a conventional example of a battery pack apparatus and a printer;

DESCRIPTION OF THE PREFERRED EMBODIMENT

Hereinafter, the description is made on one embodiment according to the present invention. Especially, a battery pack apparatus which functions as a power supply device in this embodiment is described, for example, by the electric source for printer use. The outer formation of the battery pack is just similar one as shown in FIG. 2., the therefore, the description for this part is deleted.

In accordance with an aspect of the invention, the construction of an ink jet printer 102 which uses the ink jet recording method connecting the battery pack is described in detail with reference to FIG. 3 to FIG. 6.

Figure 3:
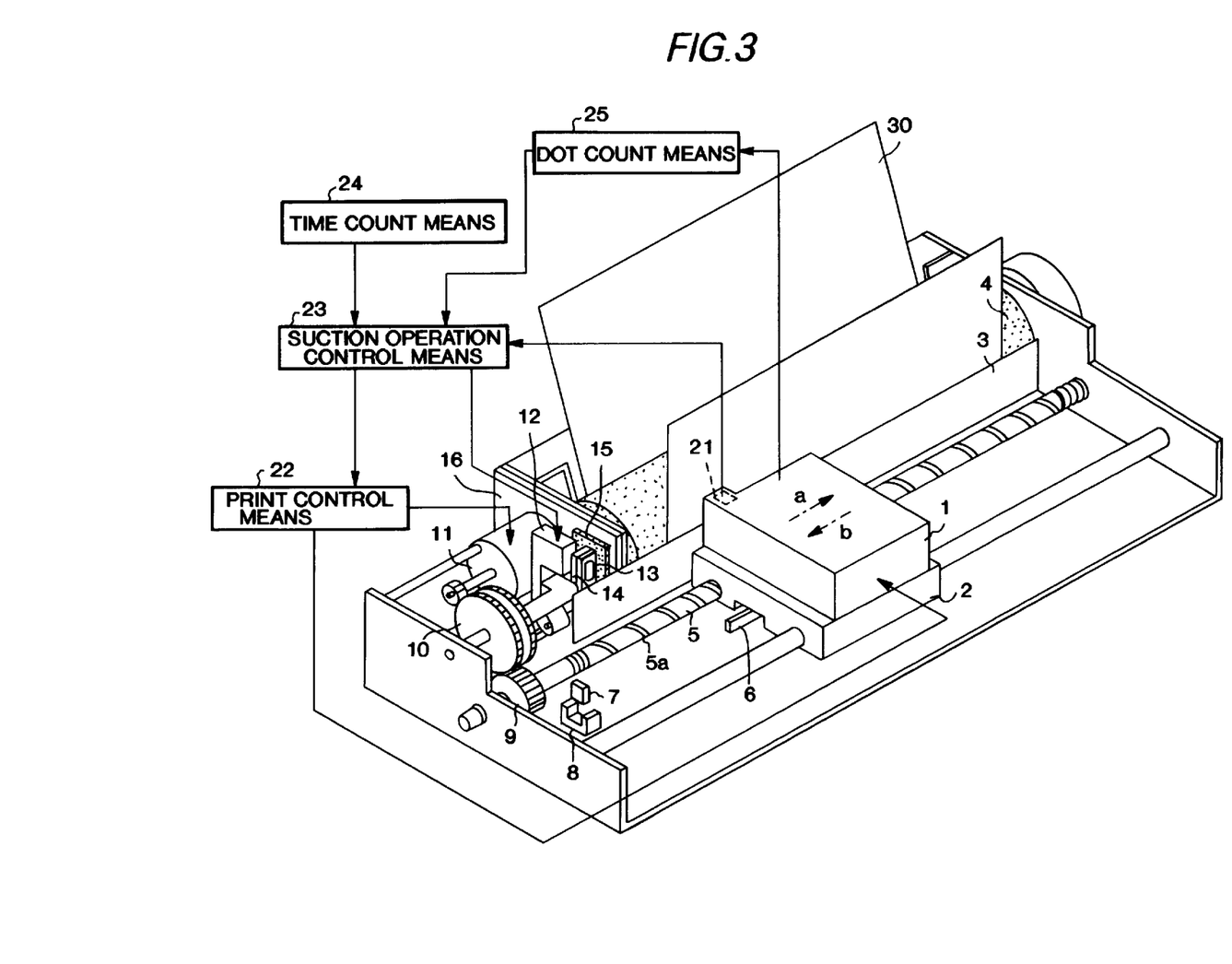
FIG. 3 is a perspective view illustrating a printer to be connected to the battery pack apparatus of the invention.

FIG. 3 is a perspective view which shows the inner construction of the ink jet printer 102. FIG. 3 also illustrates the relation between the construction of ink jet printer 102 and the constructions of a various kinds of control means to be understood by those of the prior art.

The ink jet printer 102 shown in FIG. 3 adopts the recording method which scans and records by moving the recording medium to the main scanning direction, then, scans by moving the recording medium to the sub-scanning direction after the recording of a specified region by main scanning, thus, completes the formation of image on the most part of the recording medium by repeating the main and sub-scannings. A recording apparatus which adopted the afore-mentioned recording method is named generally as a serial printer.

As shown in FIG. 3, by transmitting forward and reverse rotations of drive motor 11 to feed screw 5 through two driving force transmission gears 9 and 10, a carriage 2 is moved reciprocally towards the directions of arrows "a" and "b" in FIG. 3. An ink jet cartridge 1 for printing use is mounted on the carriage 2. The ink jet cartridge is composed of and integrally formed with an ink tank, which is not shown in FIG. 3, and an ink jet head 18 which is also not shown in FIG. 3, which is equipped with a discharge means to discharge ink toward a recording medium 30, such as the sheet paper. The ink jet head 18 is described hereinafter with reference to FIG. 4. Furthermore, a platen 4 which carries the recording medium is equipped rotatably as in the opposing state to the cartridge 1.

The recording medium 30 is carried by the rotation of the platen 4 and is pressed to the platen 4 side by a paper presser bar flat 3 on the opposing side of the ink jet cartridge 1, thus, a space between the recording medium and a discharge opening face of the ink jet head 18 in the ink jet cartridge 1 is maintained at a predetermind amount. Then, the drive moter is operated so as to move and scan the carriage 2, while ink is discharged from the discharge opening of ink jet head 18 simultaneously, thus the recording is carried out on the recording medium 30. The printing operation is performed based on the control from a printing controlling means. Ink jet printer 102 in FIG. 3 counts dot numbers being formed by the discharged ink of the aforementioned printing operation using the dot counting means 25. Also, a temperature sensor 21 is equipped in the ink jet head 18 for determining the temperature of ink jet head, and the electric signal corresponding to the detected temperature is supplied to a suction operation control means 23. In this embodiment the temperature sensor 21 is constructed to be equipped in ink jet head 18, while it is acceptable in any case whether the temperature sensor 21 is equipped within the ink jet head 18, or outside of the ink jet head 18 to detect the temperature, or even in the case where the sensor 21 is capable of detecting the temperature of ink jet head 18.

In FIG. 3, the carriage 2 is equipped with two photo-couplers 7 and 8 on the left side of the scanning direction of the carriage 2. These photo-couplers are position detectors for comfirming the cutout by a lever 6 which is secured to the left side of the carriage 2, and confirm the coming back of carriage 2 to the home position. After the confirmation by these photo-couplers 7 and 8 that the carriage 2 has come back to the home position, the carriage 2 is capable to scan reciprocatingly on the direction of arrow "a" or "b" in FIG. 3 by changing over the rotating direction of the drive motor 11. Then, there is provided a cap member 13 which is supported by a cap supporting member 14 in the position opposed to the ink jet head 18 outside the range of reciprocating scanning in the printing operation of ink jet cartridge 1. The cap member 13 caps all of the outlet opening face 1a of the ink jet head 18, as referred to FIG. 4, and is capable of preventing the evaporation or the rise of viscosity of ink. Furthermore, the cap member 13 can remove ink or air bubbles in the outlet opening by operating a suction means 12 in the condition that the outlet opening face 1a is capped by the capped member 13, thus generating negative pressure in the space closed by both cap member 13 and the outlet opening face 1a. However, it is easy to remove the viscous ink which increased its viscosity by using the recovery operation of suction, viscous ink of which is difficult to remove ink through normal discharging means. The recovery operation which utilizes the cap member 13, the suction means 12, and others stabilizes the discharging state of the ink jet head 18, also recovers this state properly even if the discharging performance be degraded due to the increased viscosity.

A cleaning blade 15 which is supported by the blade supporting member 16 is provided alongside the cap member 13. The cleaning blade 15 is supported by the blade supporting member 16 to be capable of extending towards the ink jet head 18, and is also capable of contacting the outlet opening face 1a of ink jet head 18. By protruding the cleaning blade 15 into the moving path of ink jet cartridge 1 after the suction operation by the suction mean 12 is performed, it is possible to clean out stains and/or droplets of ink remaining on the outlet opening face 1a by moving the ink jet cartridge 1. It is also possible to use the cleaning blade 15 not only in the form shown in FIG. 3, but also in the form of other blades known to those in the art.

Figure 4:
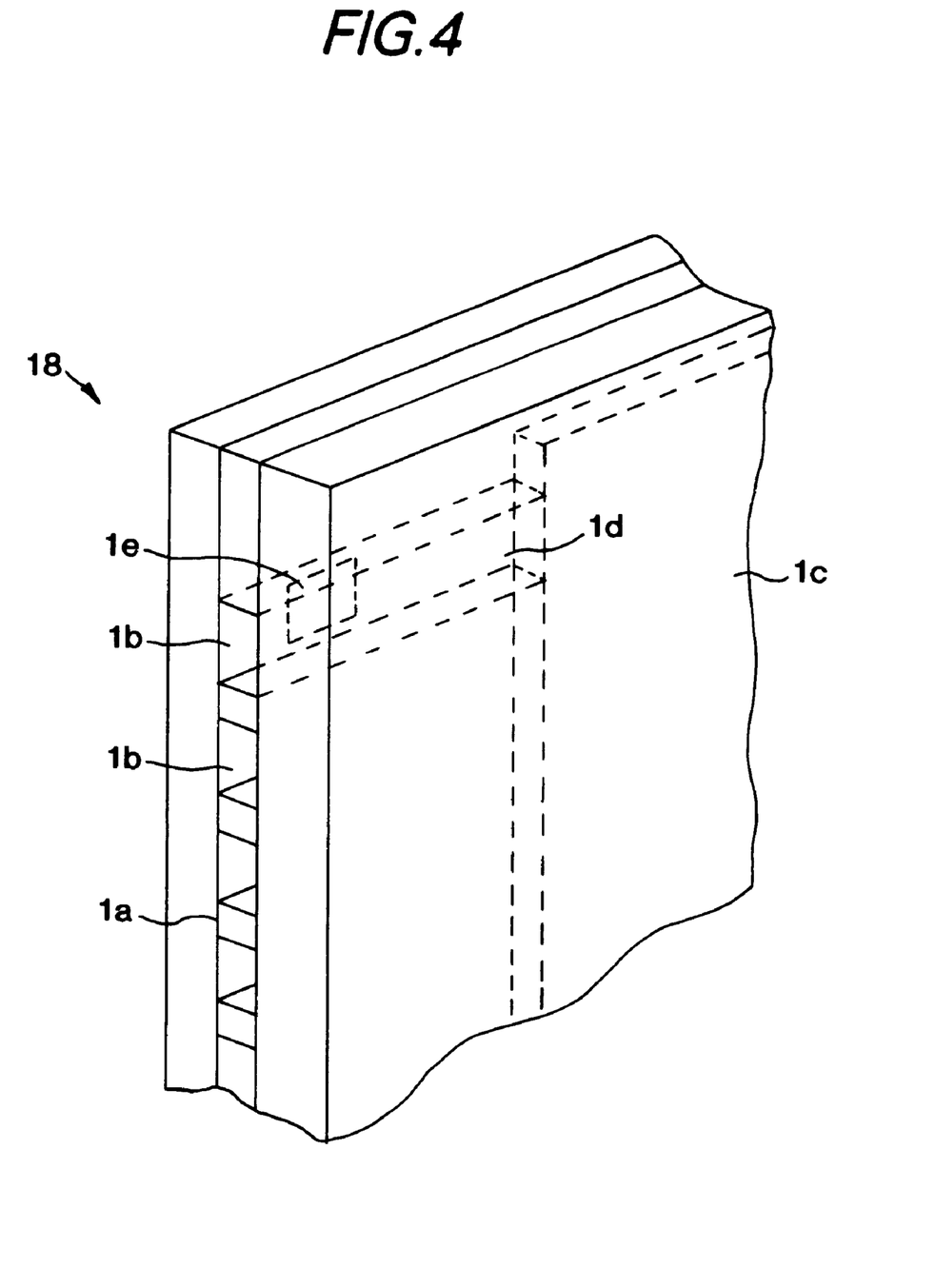
FIG. 4 is a fragmentary perspective view of a recording head in the printer shown in FIG. 2A and 2B.

FIG. 4 shows the ink jet head 18 in this embodiment which is partly extracted and enlarged. As shown in FIG. 4, the ink jet head 18 has multiple outlet openings 1b which are formed with a fixed pitch on the outlet opening face 1a opposed with a space to the recording medium 30. Also as shown in FIG. 4, the ink jet head 18 is provided with a common ink chamber 1c, ink discharge means along the wall face of each ink passage 1d where each outlet opening 1b is connected, and a heat element 1e which generates thermal energy. In this embodiment, an electric sensing element is used to generate thermal energy in response to electric signal. The common ink chamber 1c which is connected with each outlet opening and supplies ink, is in communication with an ink tank in the cartridge 1, and is supplied ink from that ink tank which is not shown in the figure. Ink which is supplied from ink tank and is stored temporarily in ink chamber 1c fills up ink passage 1d through capillary action and maintains this state. Then, the driving signal is dispatched to the heat element 1e through an electrode which is not shown and the heat element 1d is heated up, then, the ink which is contacted by heat element or is on the upper face of the heat element 1e is heated up rapidly, thus it generates bubbles within the ink passage 1d by membrane-boiling. Ink is discharged from the outlet opening 1b by this bubble generation. An ink jet system which utilizes of discharging ink by using the pressure caused by such a generation of bubbles is called the bubble jet system.

Figure 5:
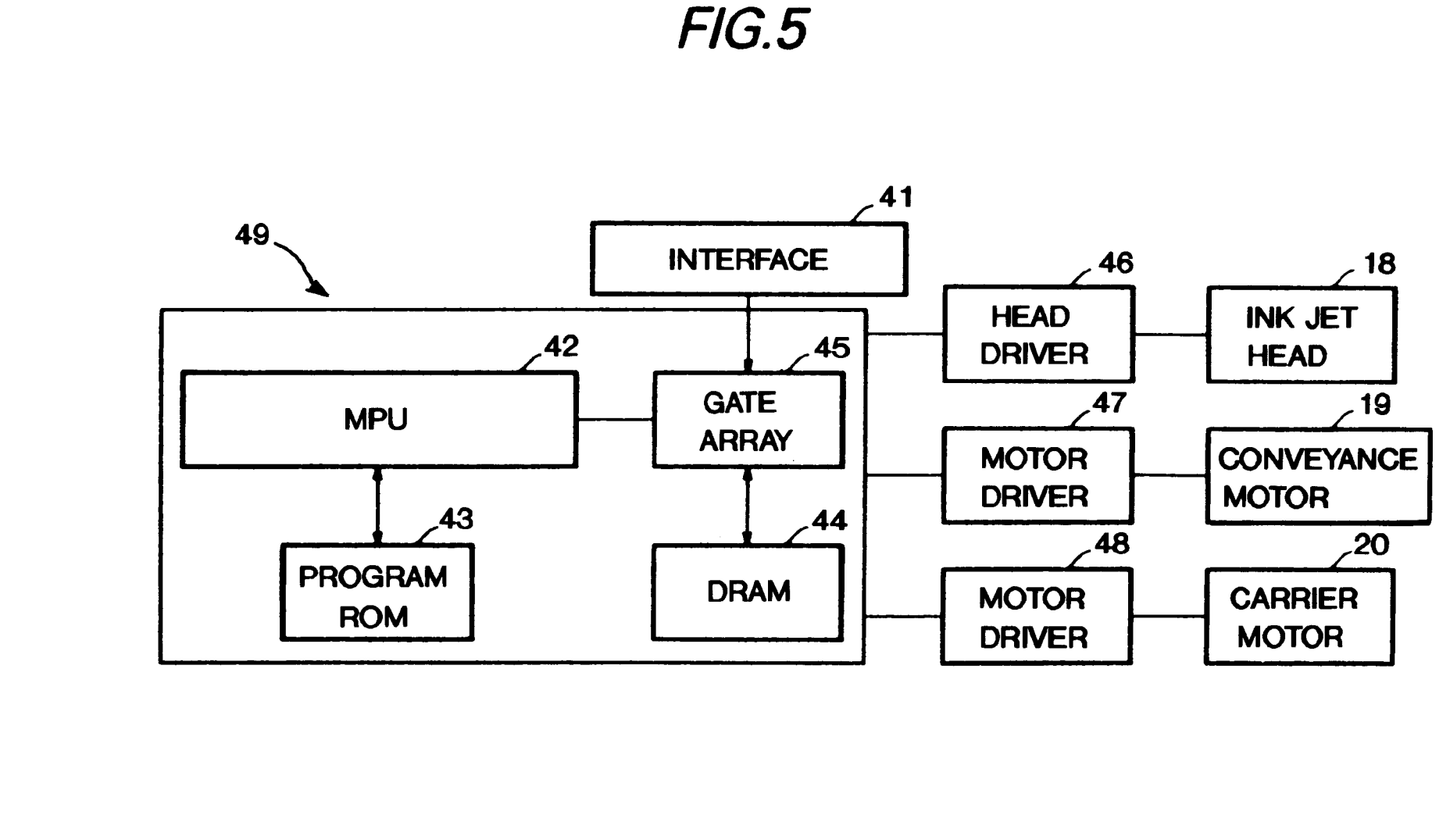
FIG. 5 is a block diagram of a control circuit for the printer shown in FIG. 2A and 2B.

FIG. 5 shows the block diagram of inner blocks composed of control means 49 which performs the control of recording apparatus as shown in FIG. 3.

In FIG. 5, reference numeral 41 is an interface which receives a printing signal, and 42 is MPU. Then 43 is ROM as a memory means to store a control program to be performed by MPU 42, and 44 is DRAM as a memory means to store a variety of data such as printing data to be supplied to afore-mentioned printing signal and ink jet head 18. This DRAM is capable of memorizing the dot number counted by the dot counting means 25 shown in FIG. 3 and the replacing times of the ink jet head 18. Reference numeral 45 is a gate array to perform the supply control of printing data against ink jet head 18, also performs to control transmission of the data among the interface 41, MPU 42 and DRAM 44. 20 is a carrier motor as a drive means to carry the ink jet head 18, and 19 is a carrier motor as a drive means to carry the printing paper. 46 is a head driver to drive the ink jet head 18, 47 and 48 are motor drivers to drive and control carrier motors 19 and 20 respectively.

Figure 6:
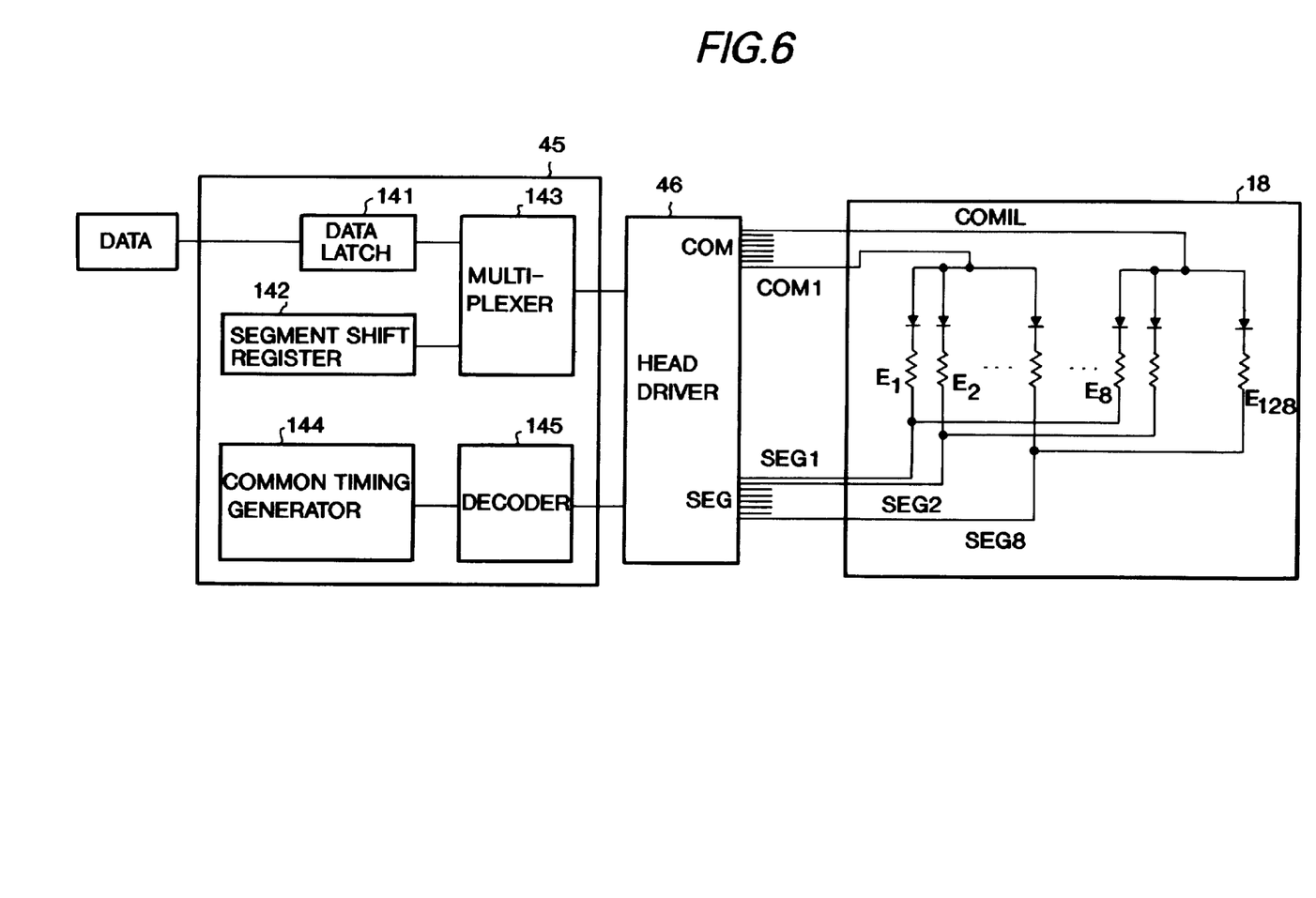
FIG. 6 is a circuit diagram of the control block shown in FIG. 5.

FIG. 6 shows a part of circuit of the control means 49 as shown in FIG. 5. In FIG. 6, the gate array 45 is composed of a data latch 141, a segment shift register 142, a multiplexer 143, a common timing generating circuit 144 and a decoder 145.

In FIG. 5, the ink jet head 18 is constructed by a diode matrix wherein the driving signal is dispatched to the heating element 1e where COM, the common signal, and SEG, the segment signal, coincide in the circuit, thereby the ink is heated and discharged from the corresponding outlet opening. The ink jet head 18 is provided with the heating element 1e, from E1 to E128.

In FIG. 5, the aforementioned decodes decodes the timing when the common timing generating circuit 144 is generated, then selects one of the common signal COM 1 to COM 16. The data latch 141 latches the printed data on 8 bits which is read out from DRAM 44, then the multiplexer 143 produces this printed data as the segment signal SEG 1 to SEG 8 in accordance with the segment shift register. The output from the multiplexer 143 is variable according to the content of the segment shift register, like 1 bit unit, 2 bits unit or 8 bits unit.

Then, the operation of the aforementioned control means are described. When the printed signals are input in the interface 41, the printed signals are converted to the printed data for printing between the gate array 45 and MPU 42. Then, the motor driver 47 and 48 are driven, and the ink jet head 18 is also driven according to the printed data which are sent to the head driver 46 to cause the printing on the recording medium 30.

Then, the construction of the power supply means of this invention is described.

The mechanical construction of the battery pack apparatus of the invention is applied corresponding to the embodiment of the prior art. That is, as shown and described in FIG. 1, the battery pack apparatus has firstly the mechanism fixed simply to the outer package of the printer 102. Also the apparatus has a power switch 104 which interlocks with the upper cover 103 of the printer 102.

Figure 7:
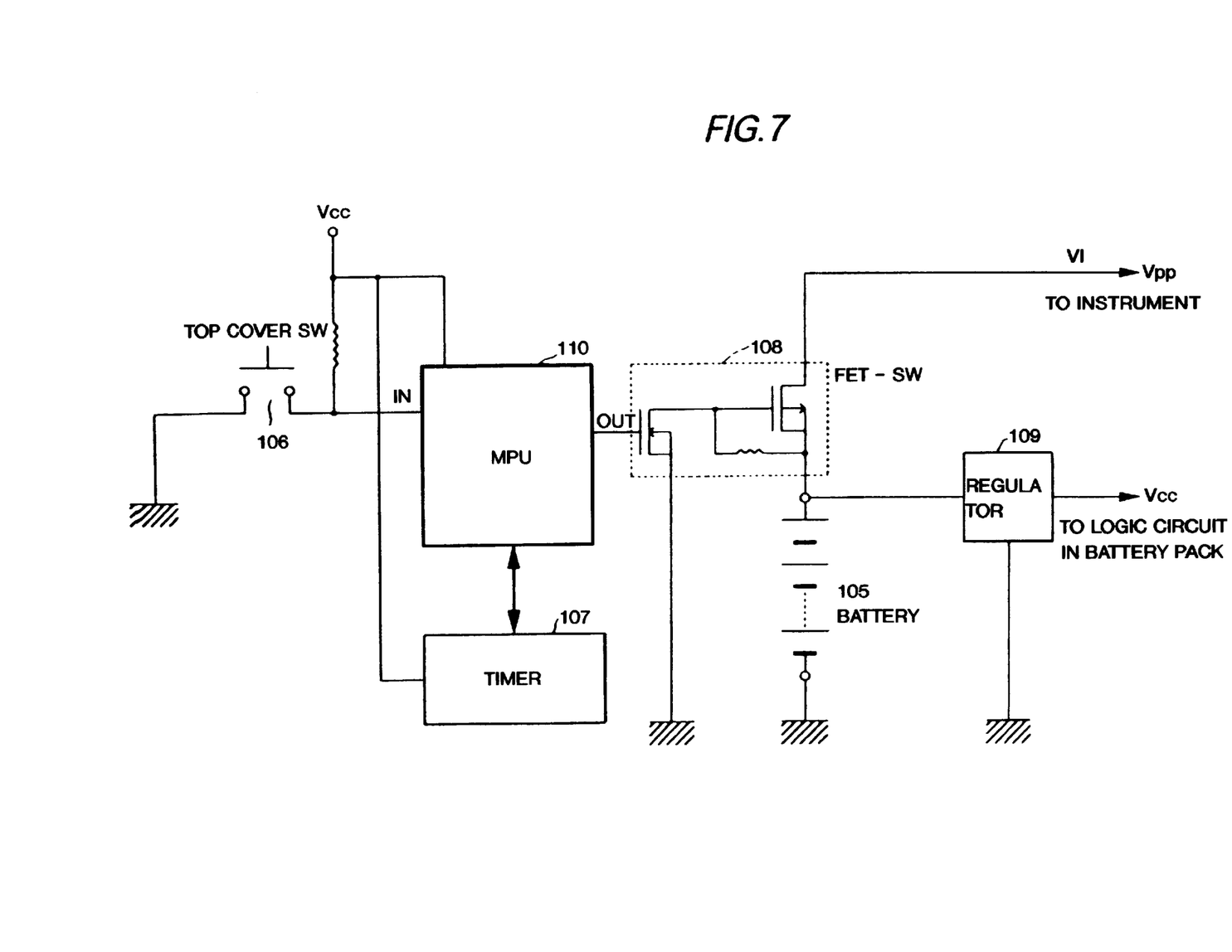
FIG. 7 is a block diagram schematically illustrating the battery pack apparatus as an embodiment of the invention.

FIG. 7 is a block diagram which shows the control circuit construction within the battery pack of the invention.

Firstly, the component in the figure is described as follows. Reference numeral 105 is a battery which is a power source in the battery pack apparatus; 106 is a switch mechanically connected with the power switch 104 which interlocks with the upper cover 103 of the printer outside the battery pack apparatus; 107 is a timer which datermines previously provided times; 108 is a FET transister switch circuit on the power supply line between the battery 105 and the printer 102; 109 is a regulator which produces powers for the logical circuit within the battery pack; and 110 is MPU which integrates and controls the control circuit of the battery pack apparatus. On-off operation of the power supply to the printers 102 which is connected on the line VL for the power supply is controlled at the circuit 108 according to the signal from MPU 110. In addition, there is no signal line for control between this control circuit and MPU 110 within the printer 102.

Secondly, a distinctive operation of the battery pack apparatus of this invention is described as follows.

When the upper cover 103 of the printer 102 as shown in FIG. 1 is in the closed state the switch 106 is off and "H" level is applied to IN port of MPU 110. MPU recognizes that the printer 102 is not in the operation stage, and outputs "L" level to OUT port. As a result, the FET switch circuit 108 is on the off state, and the power of battery 105 is not produced to power line VL, thus the battery 105 does not supply power to the printer 102.

When the upper cover 103 shifts from the close to the open, the switch 106 is on from off, and the signal at IN port to MPU 110 varies from "H" to "L" level. MPU 110 recognizes that the printer 102 is in the operation stage, and varies the OUT port signal from "L" to "H" level. As the result, the FET switch circuit 108 shifts from off to on condition, the power of the battery 105 is applied to the power source line VL, thus starting the power supply to the printer 102.

During the time when the upper cover continues to open, the switch 106 continues in on condition, thus "L" level is applied to IN port to MPU 110. MPU 110 recognizes that the printer 102 is in the operation stage, and thus, the "H" level is applied the OUT port. As the results, the FET switch circuit 108 is in on condition, and the power supply is continued from the battery 105 to the printer 102.

When the upper cover 103 shifts from the open to the close, the switch 106 becomes from on to off and the signal of IN port to MPU 110 varies from "L" to "H" level. MPU 110 recognizes that as the printer 102 is coming out of the operation stage, and also the time is for the power supply cut, thus instructs the counting start the timer. When the timer 107 finishes the predetermined time counting, the timer 107 returns the signal to MPU 110 to notify that the time is over. Then, MPU 110 varies the OUT port signal from "H" to "L" level. Accordingly, the FET switch circuit shifts from on to off condition, and stop the power supply from the battery 105 to the printer 102.

As it is clear from the aforementioned descriptions, the switch 106 is not the switch to change over practically the on and off conditions of the power supply, but it is the switch to determine the on and off conditions of the power supply, or the switch to instruct the on and off conditions operation by the switch in the prior art is not capable mainly due to the reasons where there is provided with switch which changes over the on and off conditions practically by itself, however, the switch which is formed of the present invention is capable of performing various kinds of operation before the power supply cut at the time when the power supply to the equipment goes to the off condition.

As stated in the above, in the case when the printer 102 shifts from in the operation to not in the operation stage, the battery pack apparatus of this invention shall not cut off the power supply immediately, but stands ready to keep the power supply on state during the predetermined time, thereafter cuts the power supply. Accordingly, the battery pack apparatus is in the standing ready position, the printer 102 is capable to proceed the aforementioned protective operations.

Figure 8:
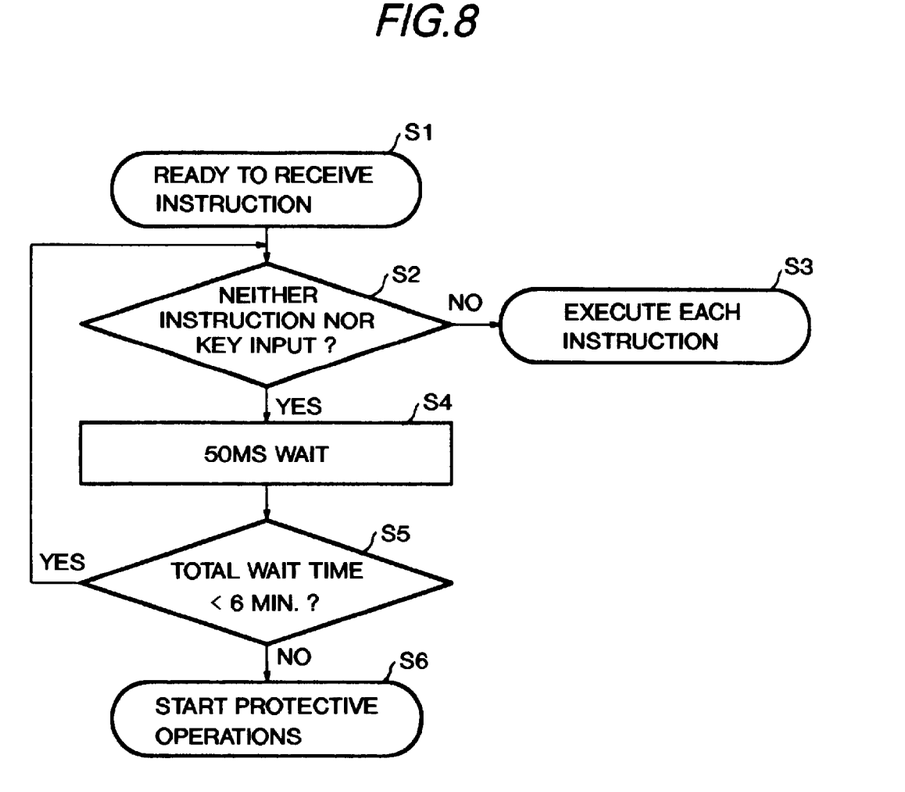
FIG. 8 is a flow chart describing the sequence of the printer connected to the battery pack apparatus.

Next, the sequence performed by an instrument connected to the battery pack of the invention, such as the printer 102,is described referring now to a flow chart in FIG. 8.

The printer, when it is in the state of being on-lined with a host instrument, is accordingly in the state ready to receive a variety of instructions, and is constructed so as to execute an instruction, in response to the entry of such instruction. Also, in the case that a device for supplying an instruction to the printer is combined with the printer, such as a word processor, the printer is in general in a stand-by state to execute an instruction immediately after it is entered. In addition, when there is a long period of time during which no instruction is entered, there are several types of protection on printers, such as one performing a protective operation for the apparatus even if suddenly the power source is turned off, or another automatically turning the power off after performing a protective operation.

The sequence shown in FIG. 8 provides an adequate protective operation when no instruction is entered for a long period of time, and therefore provides a stand-by state to immediately start a printing operation, upon entry of a subsequent printing instruction.

As shown in FIG. 8, the step S1 starts the sequence, and the step S2 determines whether an instruction is entered. Upon entry of an instruction, the step S3 executes the received instruction. The step S4 waits for a time interval of 50 ms, and the step S5 determines whether the time during which no instruction is entered exceeds a predetermined time period, where such a time is 5 minutes in the embodiment. Such a time, which provides the standard of determination, may be that suitable for the apparatus to perform the protective operation, when no instruction is entered. When the time does not exceed 5 minutes, the sequence is returned to S2, and S2 again determines whether any instruction is entered. Also, when the period having no instruction exceeds 5 minutes, control goes from S5 to S6, and the step S6 performs the protective operation.

As previously described, the protective operations performed in step S6 includes: returning of the recording head to the standard position, cleaning of the face of the ink discharge outlet of the recording head, recovery operation for recovery and stabilizing of the ink ejecting state of the recording head, and capping for preventing evaporation or blinding of ink adjacent the ink discharge outlet by covering the discharge outlet with a cap. By such protective operations, even a long period is lapsed without entry of instrucions and will cause the ejecting condition is likely to be unstable, it is enabled to recover the ejection condition of ink, and further the effect is achieved in preventing evaporation of ink from the discharge outlet by capping, and preventing blinding of the ink discharge outlet by the ink having increased viscosity. After performing the aforementioned protective operations, since the face of the ink discharge outlet is protected by capping, even a sudden suspension of the power supply would not prevent maintenance of the stable ejection of the ink of the recording head.

The operation of a control circuit in the battery pack apparatus shown in FIG. 7 is now described with reference to the flow chart in FIG. 9.

The Step S11 starts the sequence, and subsequently, step S12 determines the state of the switch connected to the top cover 103. When the cover 103 is opened, Step S13 supplies the power to the connected instrument. Step S14 awaits for 50 ms. Step S15 determines whether the time lapse of the closing state of cover 103 exceeds the predetermined time, such as whether exceeding 6 minutes as is in the embodiment. When the closing time is less than 6 minutes, it is returned to S12, while, when it is determined to have exceeded 6 minutes, moved to S16, and S16 suspends the supply of power from the battery pack. As shown by the flow chart in FIG. 9, the operations in steps S12, S14 and S15 are performed by the top cover switch, MPU 110 and timer 15, in the manner that the time lapse in the state of the top cover 103 being closed is measured, and when the measured time exceeds the predetermined amount of time, the MPU 110 controls the circuit 108 to suspend the supply of the power from the power source 105 to the electric power line VL.

The period of time necessary for the timer 7 to count the time and suspend the power supply is in advance set up so as to permit the printer 102 to perform the protective operations with a sufficient time.

As described above, the invention is featured, under maintaining a simple construction between the battery pack apparatus and the connected instrument by providing a simple circuit within the battery pack apparatus, to provide a battery pack apparatus capable of performing a number of protective operations to be performed prior to the suspension of the supply of the power from the battery pack apparatus.

Other Embodiments

Figure 9:
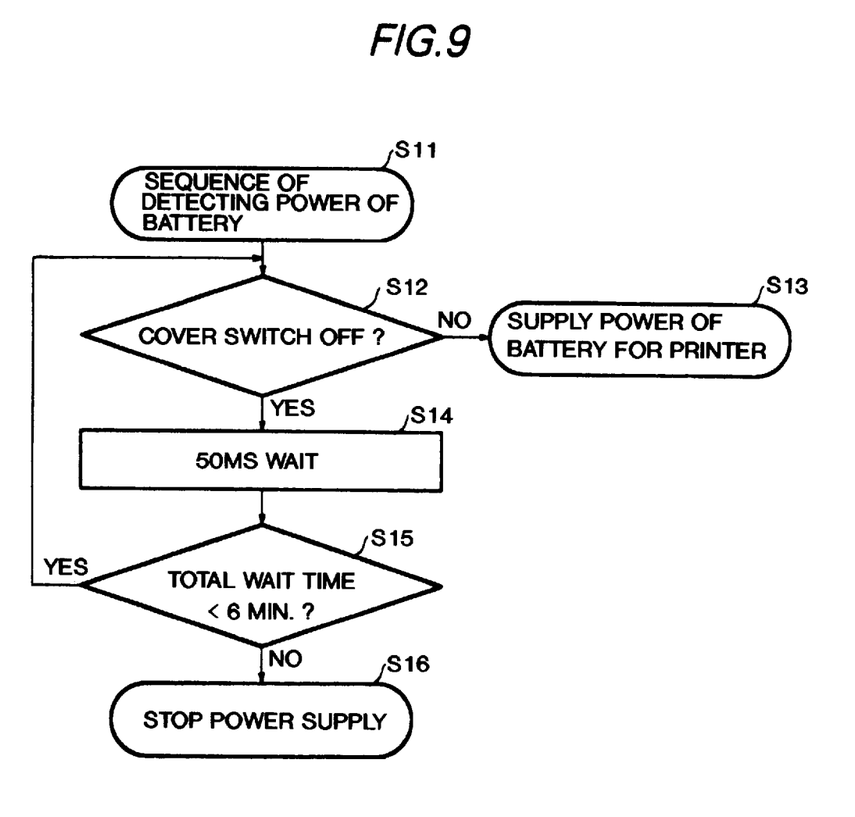
FIG. 9 is a flow chart describing the sequence of the internal circuit of the battery pack apparatus.

Although the stand-by time is specified as 50 ms in step S4 in FIG. 8 or in step S5 in FIG. 9, the amount of which is not always limited in an amount of time, and may be set in accordance with the printer and supply device used.

Also, the time as the standard for determination is not always limited in 6 minutes as specified in step S15 of FIG. 9, and may be any amount of time longer than that determined in step S5 in the flow chart of FIG. 8.

The period of time, ranging from the time the closing of the top cover 103 of printer 102 is detected to the time the power supply is actually suspended, is designed to be longer than the period during which no instruction is entered to the printer.

Accordingly, when the power is suspended to be supplied to the printer 102, it is always the protective operations for the printer 102 have been already completed. As a result, the printer would not be in any way left without being subjected to any protective operation, accordingly the performance of the printing head is steadily maintained, and the lowering of printing quality would not be caused.

Also, not limited in use for the battery pack for the printer, the featured construction of the invention is applicable to the battery pack for any other instruments including communications or OA instruments. Instruments to be connected thereto may include those such as terminal devices for the portable computers. Such a terminal device can be constructed such that the power is automatically suspended, following the protective operations for storing the data or status just being processed into the memory, and, accordingly, the apparatus can be readily returned to the initial state, when the power is re-entered.

According to the invention, the battery pack apparatus may be also of the structure of chargeable or to be supplied by the home use power line.

In the case of being connected to the home line, the change-over means can be provided for being changed from the battery to the line in order to save the battery power. Also, in the same case as above, the structure of always supplying the power can be selected without providing control performed by the MPU 110, even the cover is closed.

The battery pack apparatus of the invention is also applicable for the arrangement formed in that, instead of the printer, a recording device (image forming device) is connected to the power supply device.

Also featured by providing a simple control circuit within the battery pack, it is possible to maintain the simple structure between the battery pack and the instrument, and also the protective operation is performed prior to disconnection of supplement of the power from the battery pack apparatus.

What is claimed is:

1. A power supply apparatus having a power source device for supplying electric power to an instrument connected to said power source device, the instrument being one that automatically performs a protective operation after a predetermined interval of time has passed since a most recent operation of the instrument and said power supply apparatus being separable from the instrument, said apparatus comprising:

an electric terminal for outputting the electric power supplied from said power source device to the connected instrument through said terminal;

switching means for switching a switching status in mechanical linkage with a mechanical movement of a cover portion of the instrument, wherein closing the cover portion of the instrument converts said switching means to a status for instructing said apparatus to suspend supplying the electric power to said terminal;

timer means for measuring an elapsed time after said switching means is converted to said status for instructing said apparatus to suspend supplying the electric power to said terminal; and control means for controlling the supply of electric power from said power source device to said terminal, wherein said control means suspends supplying of electric power to said terminal when a predetermined time is measured by said timer means, wherein said predetermined time is established so as to be longer than the interval of time after which the instrument automatically performs the protective operation and wherein the instrument can operate in an open status of the cover.

2. A power supply apparatus according to claim 1, wherein said switch means is changed over in conjunction with a mechanical movement of a particular part of said instrument.

3. A power supply apparatus according to claim 2, wherein said instrument includes a cover member and said switch means is changed over in conjunction with opening/closing movement of said cover member.

4. A power supply apparatus according to claim 1, wherein said control means includes timing means for measuring said predetermined period of time.

5. A power supply apparatus according to claim 4, wherein said power supply device is a reusable battery through the process of electric charging.

6. A power supply apparatus according to claim 1, wherein said instrument connected to said power supply apparatus performs an operation necessary for returning to a state which is enabled to recover after a predetermined period of time even the supplement of said power supply is suspended; and said control means suspends supplement of said power supply for said instrument, at the time when said switch means is converted to the state for indicating suspension of supplement of said power supply for said instrument, after measuring a period of time longer than said predetermined period of time.

7. A power supply apparatus according to claim 1, wherein said power supply device is a reusable battery through the process of electric charging.

8. An image forming system comprising:

an image forming device having a recording head for forming an image on a recording medium in response to entry of an instruction; and a power supply apparatus equipped outside and separable from the image forming device and having a power source device for supplying electric power to the recording device, wherein said image forming device includes:

protective operation control means for performing a protective operation for protecting the recording head, when an instruction relative to image forming has not been entered in a first predetermined period of time, said protective operation being performable in a state when power is supplied from said power supply apparatus, and wherein said power supply apparatus includes:

an electric terminal for outputting the electric power supplied from said power source device to said image forming device through said terminal;

switching means for switching a switching status in mechanical linkage with a mechanical movement of a particular part of said image forming device, wherein closing the particular part of said image forming device system converts said switching means to a status for instructing said power supply apparatus to suspend supplying the electric power to said terminal;

timer means for measuring an elapsed time after said switching means is converted to said status for instructing said power supply apparatus to suspend supplying the electric power to said terminal; and control means for controlling the supply of electric power from said power source device to said terminal, wherein said control means suspends supplying of electric power to said terminal when a second predetermined time, longer than said first predetermined period of time, is measured by said timer means, wherein said image forming device can operate in the open status of the particular part of said image forming device.

9. An image forming system according to claim 8, wherein said recording head is an ink jet recording head having an ink discharge outlet for ejecting said ink from said discharge outlet to create an image onto said recording medium.

10. An image forming system according to claim 9, wherein said recording head includes a thermal energy generating device for applying thermal energy for said ink to produce air bubbles by applying said thermal energy, and to eject said ink utilizing the pressure which is generated in response to production of said bubbles.

11. An image forming system according to claim 9, wherein said image forming device includes cap means for capping said ink discharge outlet of said recording head, and said protective operation performed by said protective operation control means includes said action of capping said ink discharge outlet by said cap means.

12. An image forming system according to claim 11, wherein said image forming device includes recovery means said protective operation performed by said protective operation control means includes the action performed by said recovery means.

13. An image forming system according to claim 11, wherein said image forming device includes cleaning means for cleaning a discharging face of said ink discharge outlet of said recording head, and said protective operation performed by said protective operation control means includes said action performed by said cleaning means.

14. An image forming system according to claim 13, wherein said image forming device includes a wiping member for wiping said discharging face of said ink discharge outlet, and cleaning operation performed by said cleaning means includes said wiping action on said discharging face performed by said wiping member.

15. An image forming system according to claim 8, wherein said power source device is a reusable battery through the process of electric charging.

16. An image forming system according to claim 8, wherein said image forming device includes a cover member and said switch means is changed over in conjunction with opening/closing movement of said cover member.

* * * * *

UNITED STATES PATENT AND TRADEMARK OFFICE
CERTIFICATE OF CORRECTION

PATENT NO. : 6,045,274

DATED : April 4, 2000

INVENTOR(S): HIDEKI NAKANISHI

It is certified that error appears in the above-identified patent and that said Letters Patent is hereby corrected as shown below:

COVER PAGE AT ITEM [56]:
U.S. Patent Documents: insert --5,581,772 12/1996 Nanno et al. 395/750--, --5,572,242 11/1996 Fujii et al. 347/23--, and --5,475,404 12/1995 Takahashi et al. 347/23--.

COLUMN 2:
Line 20, "117. #" should read --117.--.

COLUMN 3:
Line 63, "overcame" should read --overcome--.

COLUMN 5:
Line 35, "a" should be deleted; and
Line 45, "afore-mentioned" should read --aforementioned--.

COLUMN 7:
Line 31, "afore-mentioned" should read --aforementioned--; and
Line 56, "decodes" (1st occurrence) should read --decoder--.

COLUMN 8:
Line 24, "transister" should read --transistor--.

COLUMN 9:
Line 29, "102,is" should read --102, is--.

UNITED STATES PATENT AND TRADEMARK OFFICE
CERTIFICATE OF CORRECTION

PATENT NO. : 6,045,274

DATED : April 4, 2000

INVENTOR(S): HIDEKI NAKANISHI

It is certified that error appears in the above-identified patent and that said Letters Patent is hereby corrected as shown below:

COLUMN 10:
Line 8, "instrucions" should read --instructions--, and "is likely" should be deleted.

Signed and Sealed this

Seventeenth Day of April, 2001

Attest:

NICHOLAS P. GODICI

Attesting Officer  Acting Director of the United States Patent and Trademark Office